Feb. 24, 1959     G. B. LINDERMAN     2,874,900
PULSE COMPARING APPARATUS
Filed March 1, 1956     5 Sheets-Sheet 1

INVENTOR
GARRETT B. LINDERMAN
BY Raymond Wootten
ATTORNEY

Feb. 24, 1959

G. B. LINDERMAN 2,874,900

PULSE COMPARING APPARATUS

Filed March 1, 1956

INVENTOR
GARRETT B. LINDERMAN

BY
ATTORNEY

Feb. 24, 1959  G. B. LINDERMAN  2,874,900
PULSE COMPARING APPARATUS
Filed March 1, 1956  5 Sheets-Sheet 5
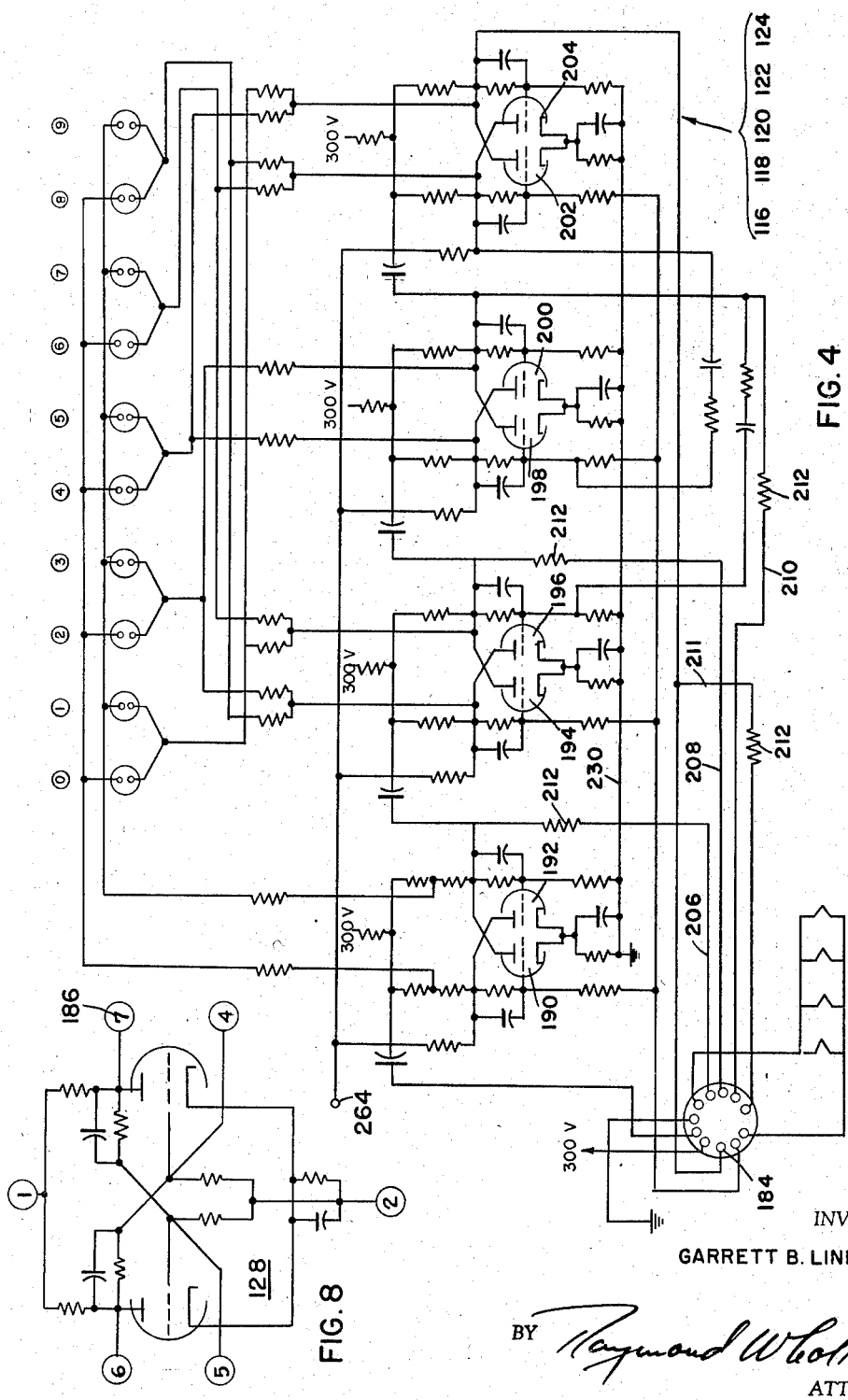
INVENTOR
GARRETT B. LINDERMAN
BY Raymond W. Colter
ATTORNEY

United States Patent Office 2,874,900
Patented Feb. 24, 1959

2,874,900

PULSE COMPARING APPARATUS

Garrett B. Linderman, Washington, D. C., assignor to GBL Corporation, a corporation of Maryland Application March 1, 1956, Serial No. 568,804

13 Claims. (Cl. 235—103.5)

This invention relates to pulse comparing apparatus eminently suited for use as an extensometer where high precision measurements are desired and where an indication of prevailing conditions can be displayed at all times before the operator.

It has been commonplace to use tachometer generators in the construction of extensometers used in rolling mills for indicating the reduction effected upon the sheet stock as it passes through the mill. It has not been possible with such systems however, to obtain indications having a precision of the order of 0.1% or better to meet the requirements now developing in this field.

It is among the objects of the present invention to provide pulse comparing apparatus and extensometer devices capable of satisfying these growing demands for high precision and at the same time provide a display of prevailing conditions at any location or locations desired.

An extensometer in accordance with the present invention may comprise first means for generating pulses as a function of the initial length of a sheet to be reduced, second means for generating pulses as a function of the length of the sheet after a reducing operation, first counter means in circuit with the first generating means for integrating the first pulses, second counter means in circuit with the second generating means for integrating the second pulses, circuit means for comparing pulses integrated by the first and second counter means, and circuit means for initiating a counting cycle during an interval between pulses from the first generating means. The comparing circuit means may include indicator lamps or an indicator of another type and may include the use of one or more cathode followers.

The circuit means for initiating a counting cycle preferably includes gate circuit means interposed between certain of the generating means and counter means. The comparing circuit means preferably includes memory means retaining a compared counter value for one counting cycle during a sequential counting cycle and such memory means may include a bank of relays.

The circuit means for initiating a counting cycle preferably includes a switching circuit connected with one of the counter means and such switching circuit preferably includes a flipflop circuit.

It is also among the objects of the present invention to provide pulse comparing apparatus comprising a first source of pulses, a repeating counter for the pulses having a counting capacity of $10^m$ where $m$ is a positive integer, a register for indicating values below $10^m$ integrated by the counter, transfer means for resetting the register, a second source of pulses, a second repeating counter for pulses from said second source having a counting capacity of $10^n$ where $n$ is a positive integer, reset means for said counters, pulse interrupting means interposed between said sources and counters; and sequence timing means actuated by the second counter at values of $10^n$, the timing means sequentially: actuating the interrupting means to interrupt transmission of pulses from the sources to the counters, actuating the transfer means to reset the register to correspond with the count of the first counter, actuating the reset means to reset both counters to zero, and actuating the interrupting means to restore transmission of pulses from the sources of the couners.

Delay means responsive to a pulse from the second source is preferably operatively associated with the interrupting means to initiate transmission during an interval between pulses from the second source. The transfer means preferably includes a memory device for storing the count of the first counter between operations of the reset means. It is preferable that the value $n$ exceeds $m$. In a preferred form of the invention, the sequence timing means includes a plurality of electrical relays.

A more complete understanding of the invention will follow from a detailed description of the accompanying drawings wherein.

Figure 9:
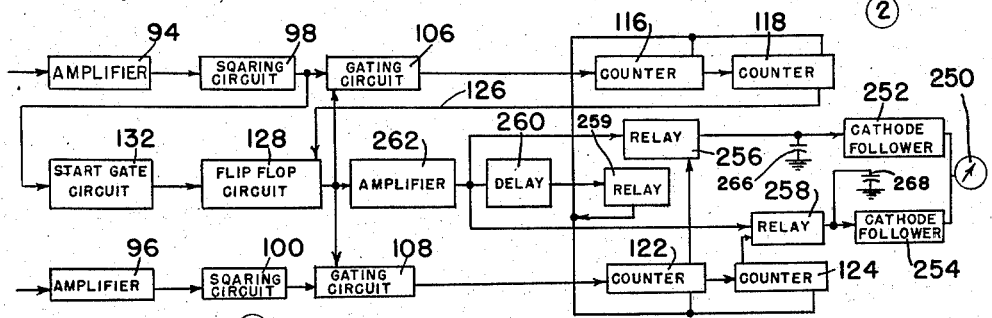
Figure 2:
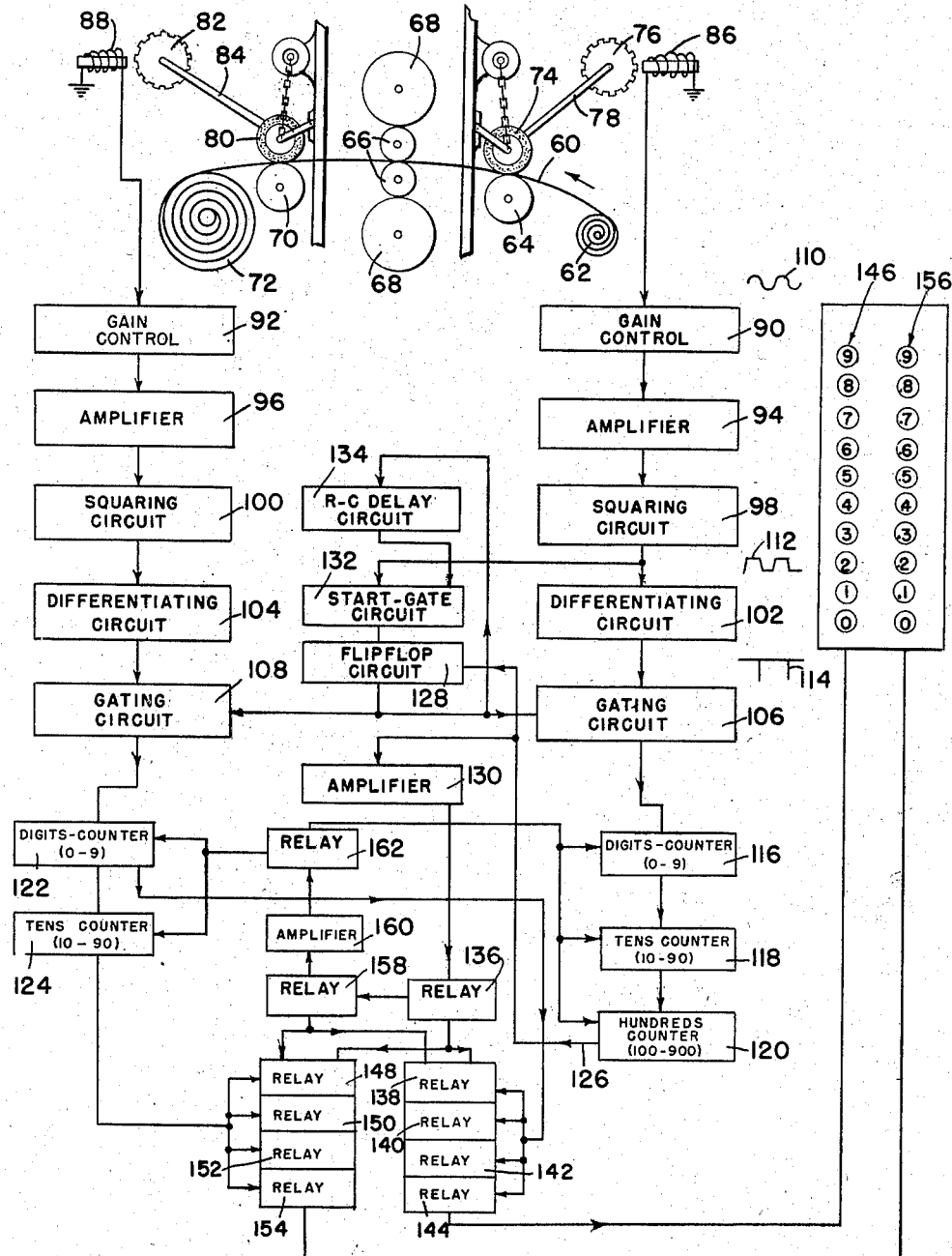
Fig. 2 is a block diagram schematically depicting another form of the invention.
Figure 3A:
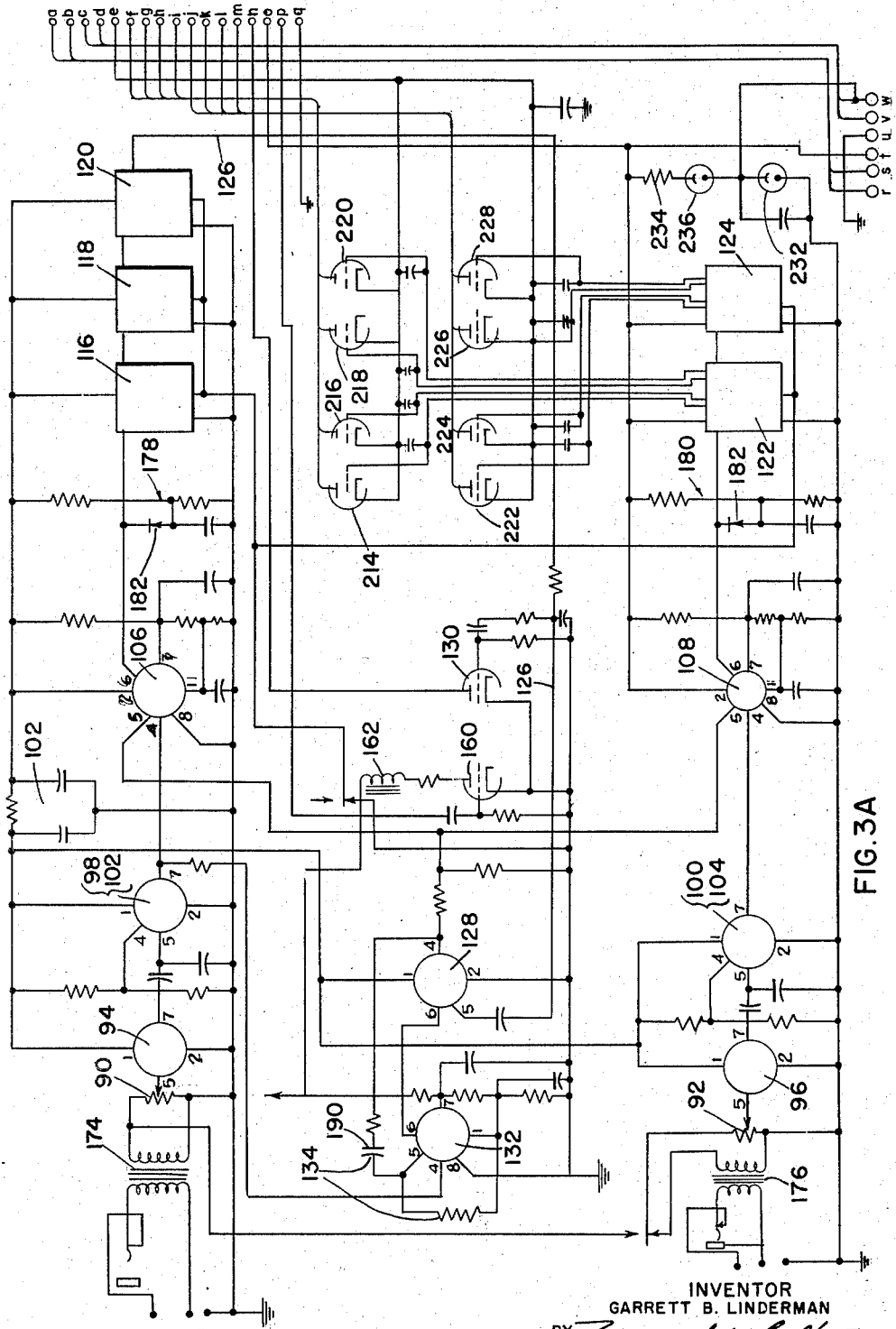
Figure 3B:
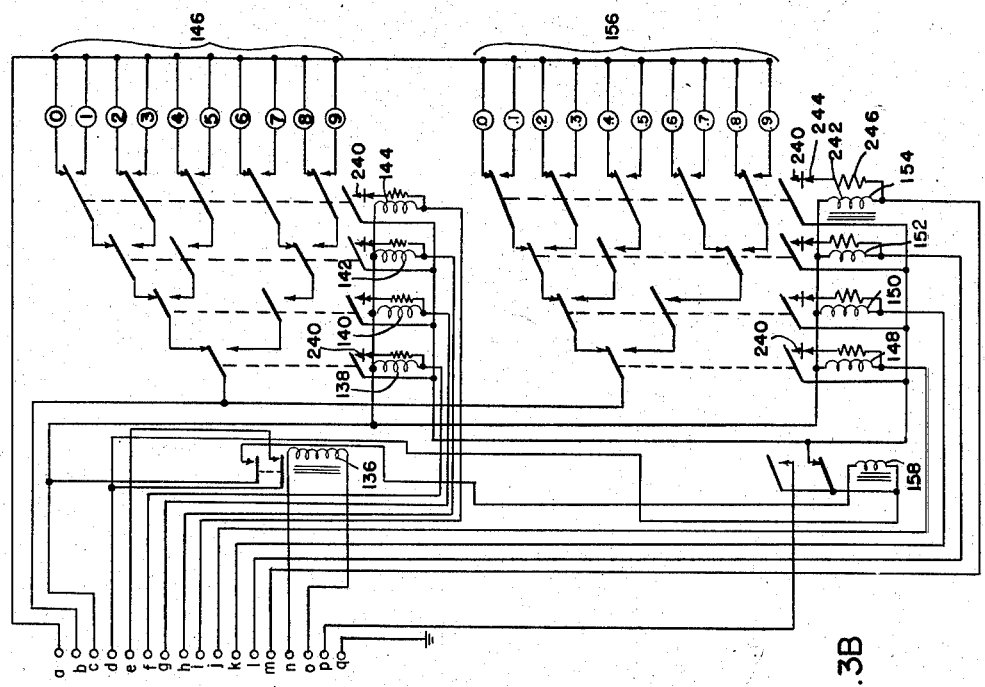
Figure 3C:
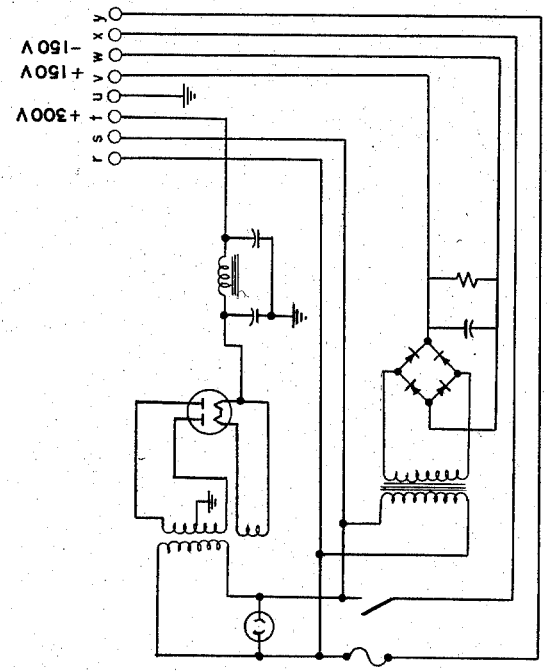

Fig. 3A, Fig. 3B, and Fig. 3C, constitute a circuit diagram conforming to the form of the invention depicted by the block diagram of Fig. 2;

Fig. 4 is a circuit diagram of one of the counters of Figs. 2 and 3A;

Figs. 5, 6, 7 and 8 are circuit diagrams of certain components depicted in Figs. 2 and 3A; and Fig. 9 is a block diagram schematically illustrating another form of the invention.

Figure 1:
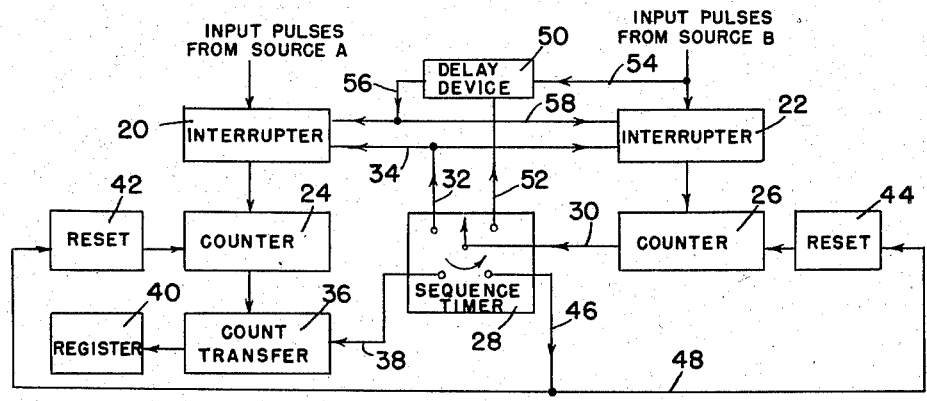
Fig. 1 is a block diagram schematically depicting components employed in one form of the invention.

With reference to Fig. 1, it will be noted that input pulses from a source A are fed into an interrupter 20 and input pulses from a source B are fed to an interrupter 22. Under ordinary conditions, pulses from the source A will be transmitted by the interrupter 20 to a counter 24 and pulses from source B will be transmitted through the interrupter 22 to a counter 26. When the counter 26 attains a predetermined value, which may be its highest value, it energizes a sequence timer 28 through a connection 30 to actuate the interrupters 20 and 22 through connections 32 and 34 to terminate the transmission of pulses from the two sources to their respective counters. The sequence timer then proceeds to actuate a count transfer device 36 through a connection 38 to transfer the value attained by the counter 24 to a register 40. Next in its order of operation, the sequence timer will actuate reset devices 42 and 44 through connections 46 and 48 to reset the counters 24 and 26 respectively, to their zero positions. In its fourth position, the sequence timer actuates a delay device 50 through a connection 52 permitting the delay device to be energized by the next input pulse from the source B through a connection 54. Immediately following such energization, the delay device through a connection 56 and a connection 58 will return the interrupters 20 and 22 to their normal conditions permitting pulses from their respective sources to be transmitted to their respective counters and initiate a new cycle. During the new cycle, the register 40 will retain the intelligence imparted to it by the count transfer during the previous cycle so that an operator will know the condition that he desires to monitor and permit him to make any new setting that might be required.

For purposes of illustration, it may be assumed that the counter 26 has a counting capacity of 1000 and that the counter 24 has a counting capacity of 100. Then assuming that when the counter 26 has integrated 1000 pulses, it energizes the sequence timer, at which time the counter 24 has integrated 1010 pulses. But since the counter 24 has a counting capacity of only 100, its aggregate count at that point would be only 10. Accordingly, when the count of 10 is transferred to the register 40, its significance will be 10 divided by 1000 or 1%. Had the reading of the register been 1 instead of 10, then the ratio would have a value of 0.1%.

From the foregoing it will follow that if the input pulses from source B represent a function of the length of a coil of steel to be reduced in a rolling mill and the input pulses from source A represent a function of the length of the coil of reduced steel, then the reading or indication of the register 40 represents the extension of the coil expressed in units and tenths percentagewise.

As represented in Fig. 2, a sheet of steel 60 is fed from a coil 62 over the entering billy roll 64 between work rolls 66 provided with the usual backing up rolls 68, over an exit billy roll 70 to a coil 72. A hard surface friction roller 74 engages the sheet above the entering billy roll 64 to drive a toothed wheel 76 through a shaft 78. Similarly, a hard surfaced roller 80 engages the reduced sheet above the exit billy roll 70 to drive a toothed wheel 82 through a shaft 84. These toothed wheels induce electrical pulses into their respective pick-up elements 86 and 88 supplying current to their respective gain controls 90 and 92, amplifiers 94 and 96, squaring circuits 98 and 100, differentiating circuits 102 and 104 and gating circuits 106 and 108. The pulses entering the gain control in each case will have a sinusoidal form 110, converted to a squared form 112 as fed to the differentiating circuit which in turn imparts a spiked form 114 for supplying the gating circuit.

The gating circuit 106 supplies its digits counter 116, its tens counter 118 and its hundreds counter 120 whereas the gating circuit 108 feeds its digits counter 122 and its tens counter 124. Under counting conditions, the gating circuits 106 and 108 are open permitting the pulses to energize the respective counters. When the counter 116, 118, 120 has reached its capacity of 999, the next or thousandth pulse returns the counter to zero and through a conductor 126 energizes a flipflop circuit 128 and an amplifier 130. Energization of the flipflop circuit 128 immediately effects closing of the gating circuits 106 and 108 so that no further count will be delivered to the counters until the gating circuits are reopened. After the counter 116, 118, 120 actuates the flipflop circuit 128, the latter effects closing of a start gate circuit 132 through an R-C delay circuit 134, the start gate circuit controlling pulses admitted to the flipflop circuit 128 from the squaring circuit 98. The R-C delay circuit 134 may have a time constant of three-tenths of a second in conjunction with the circuit depicted in Figs. 3A, 3B and 3C, maintaining the start gate circuit non-conducting for a corresponding period of time.

Amplifier 130 controls a normally closed relay 136 in circuit with a bank of relays 138, 140, 142 and 144 to reset a group of lamps arranged in a bank 146, and also in circuit with a group of relays 148, 150, 152 and 154 for resetting a bank of lamps 156. The relay 136 also is in circuit with a normally open relay 158 which controls an amplifier 160 to actuate a normally closed relay 162 which effects a resetting of the counters 116, 118, 120, 122 and 124 to their zero conditions. The relay 158 also contributes to a resetting of the banks of lamps 146 and 156 in a manner to be discussed in more detail. It will be understood of course, that ordinarily, at this point the counters 116, 118 and 120 will already assume their zero conditions. The resetting of the lamps and zeroizing of the counters will all be accomplished during the three-tenths of a second delay effected by the R-C delay circuit 134. When this period has elapsed, the start gate circuit will be actuated when it receives the first pulse from the squaring circuit 98 returning the flipflop circuit 128 to its open condition immediately opening both of the counter gating circuits 106 and 108 to start a new cycle. It is of great importance that the count be started immediately after a pulse has occurred so that the counter 116, 118 and 120 will count 1000 spaces rather than 1000 pulses so that error will be maintained at a minimum.

Thus it will appear that when the flipflop circuit 128 receives energy over the conductor 126 it immediately effects closing of the gating circuits 106 and 108 and the start gate circuit 132. Then, the relays 136 and 158 operate in that order to effect resetting of the banks of lamps 146 and 156 to register the new count. Then the relay 162 will be actuated to reset the counters to zero. Then the start gate circuit 132 will be opened to permit the next pulse from the source 86 to open the gating circuits for a new counting cycle.

When the counter 116, 118, 120 reaches its capacity, it produces a negative-going pulse which is sensed by the flipflop circuit 128 and the amplifier 130. This causes relay 136 to become deenergized momentarily whereupon the relays of the bank 138, 140, 142 and 144 and those of bank 148, 150, 152 and 154 corresponding to the count on the counter 122, 124, to act as memory means and maintain proper contacts for displaying the new count after relay 158 has been energized to open the holding contacts of the relays 138, 140, 142 and 144 on the one hand and relays 148, 150, 152 and 154 on the other to permit those not required by the new count to drop out. This results in leaving energized only those relays of the two banks which are required to produce the correct reading on the banks of lamps 146 and 156. This sequence of operation is important because if all of the holding contacts of the relays of the two banks were allowed to drop out before the proper ones were picked up for displaying the new count, the lamps would blink objectionably.

A circuit substantially corresponding to the block diagram of Fig. 2 has been depicted in Figs. 3A, 3B and 3C, the corresponding terminals of Figs. 3A and 3B having been indicated by lower case letters $a$ to $q$ inclusive, and the corresponding terminals of Figs. 3A and 3B having been identified by lower case letters $r$ to $w$ inclusive, the terminals $xy$ of Fig. 3C indicating supply connections. The portion of the circuit shown in Fig. 3C constitutes the power supply and that shown in Fig. 3B constitutes the memory device and indicating lamps. Insofar as possible, the reference characters of Fig. 2 have been duplicated in Figs. 3A, 3B and 3C rendering a repetition of the general description unnecessary.

Figures 5, 6:
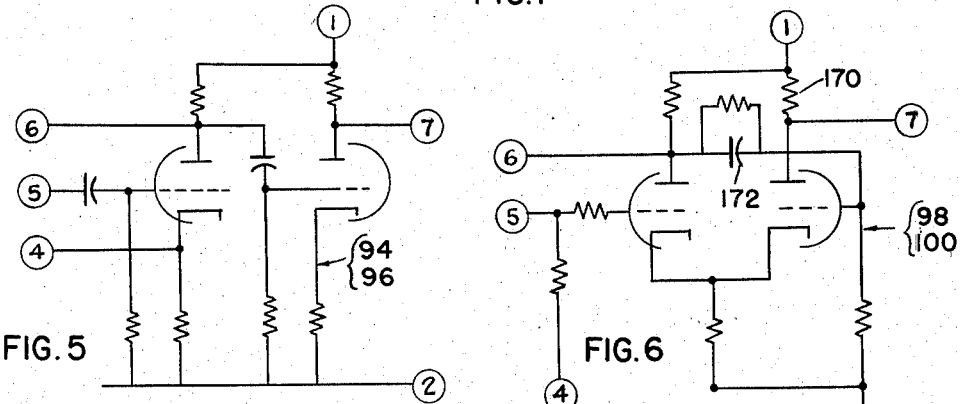
Figure 7:
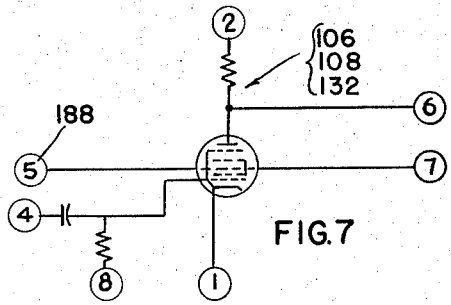

The amplifiers 94 and 96 of Fig. 3A are depicted in Fig. 5 in more detail and are actually plug-in units manufactured by Electronic Engineering Company of California, 506 East First Street, Santa Ana, California, and are known commercially as EECO–Z8762 amplifiers. Similarly, the squaring circuits 98 and 100 are shown in Fig. 6 and are obtained from the same manufacturer under the designation EECO–Z90001. The gating circuits 106 and 108 and the start-gate circuit 132, depicted in Fig. 7 are likewise plug-in units from the same source, designated EECO–Z90023, slightly modified. The flipflop circuit 128 is also from the same manufacturer, designated EECO–Z8336, depicted in Fig. 8. In connection with the squaring circuit, shown in Fig. 6, the differentiating circuits 102 and 104 are also incorporated, assuming the form of an anode resistor 170 and a capacitor 172.

Each of the decade counters 116, 118, 120, 122 and 124 is exemplified by the circuit diagram of Fig. 4 depicting in slightly modified condition Model AC–4A, Decade Counter, Serial 101, manufactured by Hewlett-Packard Company, 395 Page Mill Road, Palo Alto, California.

Signals from the billy rolls are introduced through transformers 174 and 176 to the gain controls 90 and 92 respectively, in order to provide higher voltage values. Interposed between the gating circuit 106 and its counters 116, 118 and 120 on the one hand, and between the gating circuit 108 and its counters 122 and 124 on the other, there are provided pulse limiters 178 and 180 respectively, consisting of a voltage divider and a Western Electric Company 1N 101 rectifier 182. When the counter 116, 118 and 120 have attained their thousandth count, the voltage on pin 184 of counter 120, Fig. 4, suddenly drops from a value of 135 volts to 53 volts. This drop in voltage modifies the condition of the flipflop circuit 128 so that its left side, Fig. 8, is prevented from conducting and the right side is rendered conductive. This suddenly reduces the voltage on pin 186 of the flipflop circuit from 200 volts to 100 volts, closing both of the gating circuits 106 and 108, Fig. 7, by reducing the voltage on pin 188 of each of these gating circuits, and through the capacitor 190 constituting a portion of the R-C delay circuit, closes the start-gate circuit 132 preventing any pulses from being admitted to the flipflop circuit 128. Following the three-tenths of a second delay, already discussed, the first pulse admitted to the flipflop circuit returns it to its former position wherein its left side becomes conducting, raising the voltage on the pins 188 of the gating circuits permitting them to resume the transmission of pulses to their counters.

The same drop in voltage on pin 184 of the last decade represented by counter 120, lowers the voltage on the grid of amplifier 130 which controls the lamp reset relay 136. The relay 136 as already indicated, in turn operates the lamp reset relay 158 to assure a predetermined order so that the desired indication will be retained by the lamps or other indicator during the ensuing cycle.

In connection with the decade counter illustrated in Fig. 4, it will be helpful to know which of the vacuum tubes 190, 192, 194, 196, 198, 200, 202 and 204 are in conducting condition to correspond with a particular count. This information can be tabulated as follows:

| Count | Tubes Conducting | | | |
|---|---|---|---|---|
| 0 | 190 | 194 | 198 | 202 |
| 1 | 192 | 194 | 198 | 202 |
| 2 | 190 | 196 | 198 | 202 |
| 3 | 192 | 196 | 198 | 202 |
| 4 | 190 | 196 | 200 | 202 |
| 5 | 192 | 196 | 200 | 202 |
| 6 | 190 | 194 | 200 | 204 |
| 7 | 192 | 194 | 200 | 204 |
| 8 | 190 | 196 | 200 | 204 |
| 9 | 192 | 196 | 200 | 204 |

The plate potential of the non-conducting tube in each case is always considerably above a given value, say, 105 volts whereas the plate potential of each conducting tube is always considerably below that value. Leads 206, 208, 210 and 211 from the plates of tubes 190, 194, 198 and 202 respectively, extend through 1 megohm resistors 212, in the case of counter 122 to the grids of tubes 214, 216, 218 and 220 and in the case of counter 124 to the grids of tubes 222, 224, 226 and 228. These tubes 214, 216, 218, 220, 222, 224, 226 and 228 control relays 138, 140, 142, 144, 148, 150, 152 and 154 respectively, of the memory group shown in Fig. 3B. The cathodes of the tubes 190, 192, 194, 196, 198, 200, 202 and 204 are connected together by a conductor 230 and maintained at a potential of 105 volts by means of a voltage regulator tube 232. Upon reference to Fig. 3C it will be noted that there are two D. C. power supplies, one of which has a value of 300 volts across the terminals $t-u$, the negative side of which is grounded. The other supply has a value of 150 volts across the terminals $v-w$, neither side of which is grounded. A resistor 234 and another voltage regulator tube 236 are connected across the 300 volt D. C. supply and the negative side of the 150 volt supply is connected to the junction between the two voltage regulator tubes 232 and 236. This arrangement assures a voltage having a value of 105 volts above ground on the cathodes of the tubes 214, 216, 218, 220, 222, 224, 226 and 228. It will be noted by tracing the circuit diagram of Figs. 3A and 3B that the cathodes of all of these tubes are connected to the negative side of the power supply through the lower contact of relay 136 which is held open during the counting cycle and closed only momentarily at the termination of each counting cycle. This effect is produced of course, by energization of the amplifier 130 by the decade counters 116, 118 and 120 when they reach their counting capacity.

With particular reference to Fig. 3B, it will be clear that actuation of the relays 138, 140, 142, 144, 148, 150, 152 and 154 effect energization of certain lamps of the banks 146 and 156. For example, when relays 142 and 144 are energized, the numeral 3 will be illuminated in the lamp bank 146. Each of these relays is provided with a holding contact 240 so that as soon as one of them is energized, a circuit is completed through its winding 242, a rectifier 244 and a resistor 246 and the normally closed lower contact of relay 158. Accordingly, so long as relay 158 is deenergized, any of the memory relays which has been energized previously will remain energized through its holding circuit. Then, when the end of a cycle is reached and the relay 136 is momentarily deenergized, the memory relays corresponding to the count then existing on the counters 122 and 124 will be energized and while thus energized, the relay 158 will be energized permitting any of the memory relays which are energized solely by their holding circuits to drop out so that the only memory relays then effective will be those corresponding to the count which it is desired to retain on the lamps of the banks 146 and 156.

The modification depicted in Fig. 9 has received reference characters corresponding to those of Fig. 2 insofar as they are applicable. In this case, the indicator assumes the form of an indicating instrument or instruments 250 energized by cathode followers 252 and 254 which are in turn activated by relays 256 and 258 respectively. Relays 256 and 258 as well as relay 259 which serves to reset the counters at the proper time determined by the delay device 260, are energized by the amplifier 262 under the control of the flipflop circuit 128. The counters 122 and 124 may be of the type illustrated in Fig. 4 wherein a staircase voltage supplied at a terminal 264 will be indicative of the count, and will be applied through the relays 256 and 258 respectively, to the cathode followers 252 and 254 respectively, and to the instrument or instruments 250 which will retain a reading so long as the charges on capacitors 266 and 268 remain.

Whereas the invention has been described primarily with reference to a single application, variations will be suggested thereby to those skilled in the art. Accordingly, the specification and drawings are not to be regarded as limiting beyond the scope of the appended claims.

I claim:

1. An extensometer comprising first means for generating pulses as a function of the initial length of a sheet to be reduced, second means for generating pulses as a function of the length of said sheet after a reducing operation, first counter means in circuit with said first generating means for integrating the first said pulses, second counter means in circuit with said second generating means for integrating the second said pulses, circuit means for comparing pulses integrated by said first and second counter means, said comparing circuit means including memory means retaining a compared counter value for one counting cycle during a sequential counting cycle, and circuit means responsive to a pulse from said first generating means for initiating a counting cycle starting with a succeeding pulse.

2. An extensometer as set forth in claim 1 wherein said comparing circuit means includes indicator lamps.

3. An extensometer as set forth in claim 1 wherein said comparing circuit means includes an indicator.

4. An extensometer as set forth in claim 1 wherein said comparing circuit means includes a cathode follower.

5. An extensometer as set forth in claim 1 wherein said circuit means for initiating a counting cycle includes gate circuit means interposed between certain of said generating means and counter means.

6. An extensometer as set forth in claim 1 wherein said memory means includes a bank of relays.

7. An extensometer as set forth in claim 1 wherein said circuit means for initiating a counting cycle includes a switching circuit connected with one of said counter means.

8. An extensometer as set forth in claim 7 wherein said switching circuit includes a flipflop circuit.

9. Pulse comparing apparatus comprising a first source of pulses, circuit means connecting said first source with a repeating counter for said pulses having a counting capacity of $10^m$ where $m$ is a positive integer, circuit means connecting said counter with a register for indicating values below $10^m$ integrated by said counter, transfer means for resetting said register, a second source of pulses, circuit means connecting said second source with a second repeating counter for pulses from said second source having a counter capacity of $10^n$, where $n$ is a positive integer, reset means for said counters, pulse interrupting means interposed in said circuit means between said sources and counters; sequence timing means, and circuit means connecting said second counter and said sequence timing means whereby said sequence timing means is actuated by said second counter at values of $10^n$, said timing means controlling said circuit means and thereby sequentially: actuating said interrupting means to interrupt transmission of pulses from said sources to said counters, actuating said transfer means to reset said register to correspond with the count of the first said counter, actuating said reset means to reset both counters to zero, and actuating said interrupting means to restore transmission of pulses from said sources to said counters.

10. Pulse comparing apparatus as set forth in claim 9 wherein delay means responsive to a pulse from said second source is operatively associated with said interrupting means to initiate transmission responsive to a pulse from said second source.

11. Pulse comparing apparatus as set forth in claim 9 wherein said transfer means includes a memory device for storing the count of the first said counter between operations of said reset means.

12. Pulse comparing apparatus as set forth in claim 9 wherein $n$ exceeds $m$.

13. Pulse comparing apparatus as set forth in claim 9 wherein said sequence timing means includes a plurality of electrical relays.

References Cited in the file of this patent

UNITED STATES PATENTS

| | | |
|---|---|---|
| 2,248,504 | Kenny | July 8, 1941 |
| 2,407,320 | Miller | Sept. 10, 1946 |
| 2,516,189 | Dinsmore | July 25, 1950 |
| 2,539,673 | Peterson | Jan. 30, 1951 |
| 2,576,900 | Brockman | Nov. 27, 1951 |
| 2,616,965 | Hoeppner | Nov. 4, 1952 |
| 2,651,204 | Dickinson | Sept. 8, 1953 |
| 2,666,575 | Edwards | Jan. 19, 1954 |
| 2,672,284 | Dickinson | Mar. 16, 1954 |
| 2,705,303 | Stenger | Mar. 29, 1955 |
| 2,832,044 | Bliss | Apr. 22, 1958 |